US008773355B2

(12) United States Patent  
Perez et al.

(10) Patent No.: US 8,773,355 B2
(45) Date of Patent: Jul. 8, 2014

(54) ADAPTIVE CURSOR SIZING

(75) Inventors: Kathryn Stone Perez, Shoreline, WA (US); Rudy Jacobus Poot, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 12/405,047

(22) Filed: Mar. 16, 2009

(65) Prior Publication Data

US 2010/0231512 A1 Sep. 16, 2010

(51) Int. Cl.
*G06F 3/033* (2013.01)

(52) U.S. Cl.
USPC .......................................................... 345/158

(58) Field of Classification Search
None
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |

(Continued)

FOREIGN PATENT DOCUMENTS

| CN | 201254344 B | 6/2010 |
| EP | 0583061 A2 | 2/1994 |

(Continued)

OTHER PUBLICATIONS

Agarwal et al., "A Local Basis Representation for Estimating Human Pose from Cluttered Images," Proceedings of the 7th Asian Conference on Computer Vision, 2006, 10 pages, downloaded at https://lear.inrialpes.fr/pubs/2006/AT06/Agarwal-accv06.pdf.

(Continued)

*Primary Examiner* — Joseph Haley
*Assistant Examiner* — Emily Frank
(74) *Attorney, Agent, or Firm* — Judy Yee; Micky Minhas

(57) ABSTRACT

Disclosed herein are systems and methods for controlling a computing environment with one or more gestures by sizing a virtual screen centered on a user, and by adapting the response of the computing environment to gestures made by a user and modes of use exhibited by a user. The virtual screen may be sized using depth, aspects of the user such as height and/or user profile information such as age and ability. Modes of use by a user may also be considered in determining the size of the virtual screen and the control of the system, the modes being based on profile information and/or information from a capture device.

19 Claims, 8 Drawing Sheets
(1 of 8 Drawing Sheet(s) Filed in Color)

(56) References Cited

U.S. PATENT DOCUMENTS

| | | |
|---|---|---|
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,756 B1 | 5/2004 | Toyama et al. |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,829,384 B2 | 12/2004 | Schneiderman et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,212,665 B2 | 5/2007 | Yang et al |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 * | 9/2009 | Fujimura et al. ............... 382/104 |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |

(56) References Cited

U.S. PATENT DOCUMENTS

| | | | |
|---|---|---|---|
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2001/0017632 | A1 | 8/2001 | Goren-Bar |
| 2003/0046401 | A1 | 3/2003 | Abbott et al. |
| 2004/0207597 | A1 | 10/2004 | Marks |
| 2005/0059488 | A1 | 3/2005 | Larsen et al. |
| 2006/0188144 | A1 | 8/2006 | Sasaki et al. |
| 2006/0211462 | A1* | 9/2006 | French et al. ............. 463/1 |
| 2006/0233423 | A1 | 10/2006 | Najafi et al. |
| 2006/0239558 | A1 | 10/2006 | Rafii et al. |
| 2007/0013718 | A1 | 1/2007 | Ohba |
| 2007/0060336 | A1 | 3/2007 | Marks et al. |
| 2007/0098222 | A1 | 5/2007 | Porter et al. |
| 2007/0110298 | A1* | 5/2007 | Graepel et al. ........... 382/154 |
| 2007/0216894 | A1 | 9/2007 | Garcia et al. |
| 2007/0260984 | A1 | 11/2007 | Marks et al. |
| 2007/0279485 | A1 | 12/2007 | Ohba et al. |
| 2007/0283296 | A1 | 12/2007 | Nilsson |
| 2007/0298882 | A1 | 12/2007 | Marks et al. |
| 2007/0300185 | A1 | 12/2007 | Macbeth et al. |
| 2008/0001951 | A1 | 1/2008 | Marks et al. |
| 2008/0018595 | A1* | 1/2008 | Hildreth et al. .......... 345/156 |
| 2008/0026838 | A1 | 1/2008 | Dunstan et al. |
| 2008/0062257 | A1 | 3/2008 | Corson |
| 2008/0100620 | A1 | 5/2008 | Nagai et al. |
| 2008/0122786 | A1* | 5/2008 | Pryor et al. ............... 345/156 |
| 2008/0126937 | A1 | 5/2008 | Pachet |
| 2008/0134102 | A1 | 6/2008 | Movold et al. |
| 2008/0137956 | A1 | 6/2008 | Yang et al. |
| 2008/0152191 | A1 | 6/2008 | Fujimura et al. |
| 2008/0189628 | A1 | 8/2008 | Liesche et al. |
| 2008/0215972 | A1 | 9/2008 | Zalewski et al. |
| 2008/0215973 | A1 | 9/2008 | Zalewski et al. |
| 2008/0276186 | A1 | 11/2008 | Feduszczak et al. |
| 2008/0293375 | A1 | 11/2008 | Swanburg |
| 2009/0141933 | A1 | 6/2009 | Wagg |
| 2009/0167679 | A1 | 7/2009 | Klier et al. |
| 2009/0174658 | A1* | 7/2009 | Blatchley et al. ......... 345/158 |
| 2009/0221368 | A1 | 9/2009 | Yen et al. |
| 2011/0291926 | A1* | 12/2011 | Gokturk et al. ........... 345/158 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Ando et al., "Human Pose Estimation for Image Monitoring," NTT Technical Review, NTT Cyberspace Laboratories, Nov. 2007, 5(11), pp. 1-8, downloaded at https://www.ntt-review.jp/archive/ntttechnical.php?contents=ntr200711sf4,pdf&mode=show pdf.

Lee et al., "Human Upper Body Pose Estimation in Static Images," Institute for Robotics and Intelligent Systems, Integrated Media Systems Center, University of Southern California, downloaded at http://luthuli.cs.uiuc.edu/~daf/courses/AppCV/Papers/Lee04Eccv.pdf, on Jun. 2, 2009, pp. 1-13.

Okada et al., "Relevant Feature Selection for Human Pose Estimation and Localization in Cluttered Images," Computer Science Department, University of California, EECV 2008, Part //, pp. 434-445, downloaded at http://vision.ucla.edu/papers/okadaS08.pdf.

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Bergh et al., "Perceptive User Interface, A Generic Approach", Computer Vision in Human-Computer Interaction, (no month available) 2005, 1-14.

Paymans et al., "Usability Issues of Adaptive User Interfaces", CACTUS/D2003.15, TU-DelftlTNO, Sep. 30, 2003, 1-59.

Stuerzlinger et al., "User Interface Facades: Towards Fully Adaptable User Interfaces", Symposium on User Interface Software and Technology, Proceedings of the 19th annual ACM symposium on User interface software and technology, Montreux, Switzerland, (no month available) 2006, 9 pages.

Kanade et al., "A Stereo Machine for Video-rate Dense Depth Mapping and its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

(56) References Cited

OTHER PUBLICATIONS

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

\* cited by examiner

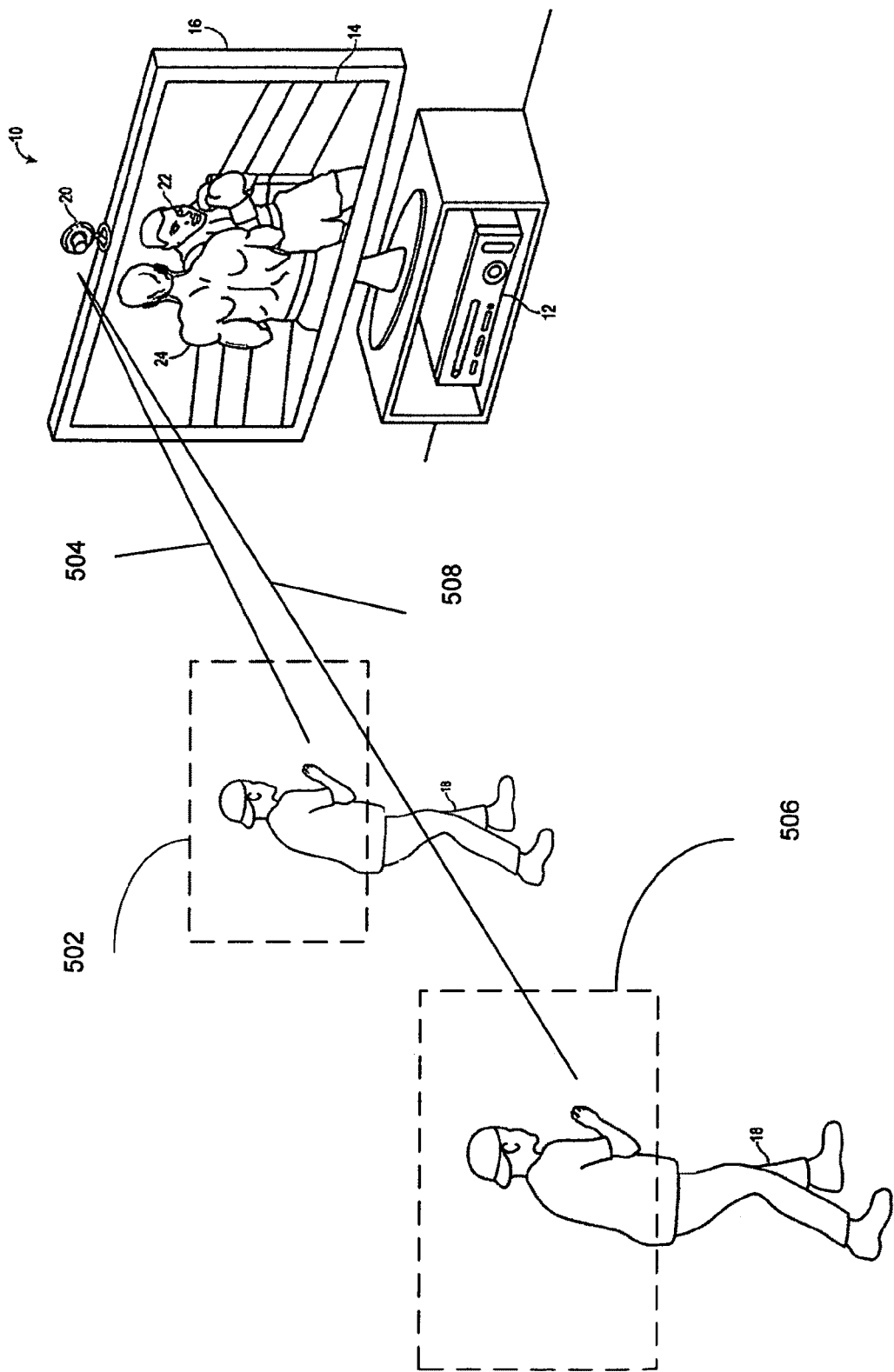

ADAPTIVE CURSOR SIZING

BACKGROUND

In a typical computing environment or gaming system, a user has a controller that he may use to interact with the system. Controllers known in the art include keyboards, mice, joysticks and the like. The response by the system to controllers in a computing environment may be programmable, such as varying the speed at which a cursor moves on a screen in response to the movement of a roller ball in a mouse, but the signal from the controller to the computing environment is typically set for a particular session or use. Pressing buttons on a mouse, keystrokes and other typical controllers tend not to be specific to the size of the user, the age of a user or the physical limitations of a user.

Currently, there is no known method in the art that allows for human input to a computing environment that can adapt to the size, distance, fidelity or physical range of motion of a user whose motions are the input to a computing environment.

SUMMARY

When control of a computing environment is shifted from a standard controller like a keyboard, to control based on gestures from a person, several problems may arise. Unlike traditional controllers where, for example, each individual keystroke has a set input for the computing environment, individual gestures may vary widely. Thus, a gesture based control system must be able to adapt to idiosyncrasies in gestures. Second, users may have different sizes and wingspans. Control of the computing environment may require a user to "reach" all four corners of an audiovisual display, and out to some distance in front of them as well. Prior approaches to this problem have involved measuring the wingspan of a person, then determining the distance the user needs to stand from a detector to properly "reach" all four corners. The user must then position himself at the particular distance or point on the ground where the virtual screen size is appropriate.

In combination with the above challenge, a fidelity problem may arise. For example, if a very tall person with a large wingspan were to use a system that requires him to stand at a distance based on his wingspan, he will be forced to stand further away from the system. Thus, in order for the system to measure motions, the person will have to gesture more dramatically. When a user is close to a sensing mechanism, he may make motions that are fine or precise and the sensing mechanism may pick those motions up. As a user moves further away, the sensing mechanism may not be able to detect fine motion.

Another challenge is that users have different physical ranges of motions and expectations of responses to particular motions. Thus, if the controller instead becomes gesture based and the computing environment must respond to the gestures that a user makes, the computing environment must adapt to characteristics of each individual user such as, for example, his size, his typical gesture modes and other features.

At least some of the problems described above are solved by adaptive cursor sizing. According to sample embodiments, when one or more users are in a capture scene, depth information and size information are received from a capture device. The depth information, size information or user profile information, or any combination thereof may be used to adapt the user experience in the computing or gaming environment in one or more ways.

In one embodiment, depth (distance from a capture device to a user) and user size information may be used to determine aspects of each user, such as, for example his height, shoulder width, arm length and the like. This information may be used to determine the size and shape of a virtual screen around each user, where the virtual screen may be a representation in physical space of the "reach" a user may need on a display. The extent of the virtual screen may match the natural curve of a person's wingspan and be equal to both the wingspan of a user and the wingspan of an avatar or representation of the user in a computing environment. Thus, if an avatar on a graphical display has "reach" to an in-screen depth and all four corners of the display, then the virtual screen should be projected onto the user such that the full reach of the user encompasses the full extent of the in-screen depth and display. Accordingly, if a user fully extends his arm towards the corner of the virtual screen, the avatar would be able to touch the corner on the graphical display. In another embodiment, the virtual screen may be a flat virtual screen placed at a depth in front of a user that a user may 'touch' in order to select one or more options.

The virtual screens may adapt to the size and depth of each user, and may remain centered on each user as he moves in a capture scene. If, for example, a user moves closer to a capture device, the screen may resize to accommodate the user. In another example, if a user twists or turns, the screen may also adapt to the motions of the user. In another example, if the user picks up or puts down a prop such as a racket, the screen will adapt to the size of the user and the prop. The screen may also adapt to any object associated with the user, such as a ball, a bat, a glove, a microphone, a guitar, a play weapon or the like. In another example, the screen may resize such that a user may 'touch' all four corners with ease in order to reduce fatigue and accommodate users who may have limited mobility.

In another embodiment, a virtual screen may be centered on and shaped to fit the range of motion of an appendage such as a head, leg, hand or arm of a user. For example, certain applications may only require the use of one arm or hand, and in such a circumstance depth information, size information and the like may be used to size a virtual screen around an appendage. Another embodiment may involve centering multiple virtual screens around multiple appendages of a user. In a further example, if a user picks up an object, such as a drink or a baby, the virtual screen may resize and switch to the free arm of the person. In each of these embodiments, the size of the virtual screen may be a representation in physical space of the "reach" of each appendage that user may need on a display.

According to other embodiments, user profiles may store information about one or more users. These profiles may be accessed upon entry of a user into a capture scene. If a profile matches a user based on a password, selection by the user, body size, voice recognition or the like, then the profile may be used in the determination of an appropriate virtual screen size.

According to another embodiment, the output on a display may adapt to aspects of each user, such as his depth, size, profile and typical modes of play. For example, icons, text or other images on a graphical display may change in size, change colors, brighten or dim, or decrease or increase in number based on the distance, and/or size and/or profile of a player. In another embodiment, important elements on a graphical display may move to easy to reach areas based on profile information or session information or distance or any combination thereof. Responsiveness of a gesture tracker may also adapt to depth, size and profile information. If, for example, the user is continually moving in an erratic or smooth fashion, the responsiveness of the gesture tracker may adapt to account for the erratic or smooth motion. As a further example, if a user tends to make small or gross gestures, the computing environment may adapt such that small gestures result in larger responses, or that gross gestures result in smaller responses respectively by the computing environment.

According to another embodiment, the system may place a cursor on the graphic display that may track the motion of a user, or the motion of one or more appendages of a user. The motion of the on screen cursor may be related to the depth and size of the user, as well as personal profile characteristics such as the user's age and ability. For example, if a person tends to make erratic motions, the cursor may move more slowly, or it may increase in size. Alternately, if a user tends to make only small movements, an on screen cursor may adapt to make large movements for small gestures.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

The systems, methods, and computer readable media for an adaptive cursor sizing based on known aspects of a player in accordance with this specification are further described with reference to the accompanying drawings in which:

FIG. 7 depicts an example of one or more targets at different distances from a capture device, and the virtual screen resizing according to factors of the target.

DETAILED DESCRIPTION OF ILLUSTRATIVE EMBODIMENTS

Figure 1A:
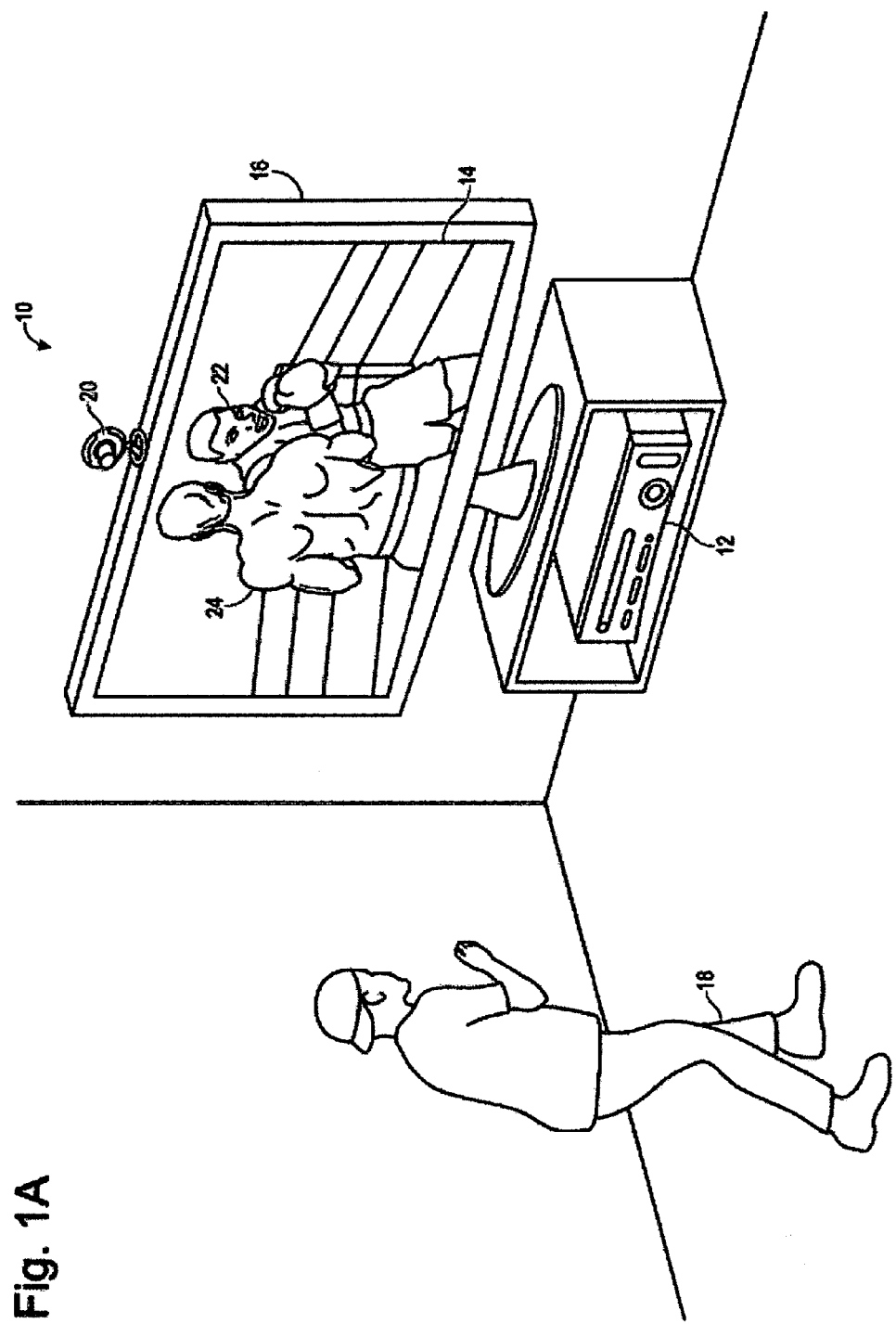
FIGS. 1A and 1B illustrate an example embodiment of a target recognition, analysis, and tracking system with a user playing a game.

As will be described herein, a user may control an application executing on a computing environment such as a game console, a computer, or the like by performing one or more gestures. According to one embodiment, users of different sizes, ages, capabilities and/or distances from a capture device, may have control of a computing environment adapt to their gestures in one or more ways.

In an embodiment, gestures may be received by, for example, a capture device. For example, the capture device may capture a depth image of a scene. In one embodiment, the capture device may determine whether one or more targets or objects in the scene corresponds to a human target such as the user. If the capture device determines that one or more objects in the scene is a human, it may determine the depth to the human as well as the size of the person. The device may then center a virtual screen around each human target based on stored information, such as, for example a look up table that matches size of the person to wingspan and/or personal profile information. Each target or object that matches the human pattern may be scanned to generate a model such as a skeletal model, a mesh human model, or the like associated therewith. The model may then be provided to the computing environment such that the computing environment may track the model, render an avatar associated with the model, determine clothing, skin and other colors based on a corresponding RGB image, and/or determine which controls to perform in an application executing on the computer environment based on, for example, the model.

The scan, skeletal model, typical gestures, age, size, session data and other information may be provided to a personal profile stored in the computing environment. The scan, skeletal model, typical gestures, age, size, and session data may also be used to update the size and shape of a virtual screen centered on a user, or on one or more of the user's appendages. The virtual screen may be a representation in physical space of the "reach" a user may need on a display. The extent of the virtual screen may match the natural curve of a person's wingspan and be equal to both the wingspan of a user and the wingspan of an avatar or representation of the user in a computing environment. In some instances, the wingspan may be less than the full reach of the person in order to prevent stress, frustration or fatigue. Thus, if an avatar on a graphical display has "reach" to an in-screen depth and all four corners of the display, then the virtual screen should be projected onto the user such that the full reach of the user encompasses the full extent of the in-screen depth and display. Accordingly, if a user fully extends his arm towards the corner of the virtual screen, the avatar would be able to touch the corner on the graphical display. In another embodiment, the virtual screen may sized to a single appendage of a person, or it may be a flat virtual screen placed at a depth in front of a user that a user may 'touch' in order to select one or more options.

Each virtual screen may continually update as a user moves in a scene by tracking the depth, size, movement, body scan, skeletal model, typical reach distance and other aspects of one or more users. In addition, the depth or profile information or both may be provided to the computing environment such that the computing environment may adapt aspects of the control features, such as, for example, adapting the mode of play, the size, color, brightness, and number of elements including a cursor, text, buttons, options and menus on a user display or responsiveness of the gesture sensing device to gestures.

Figure 1B:
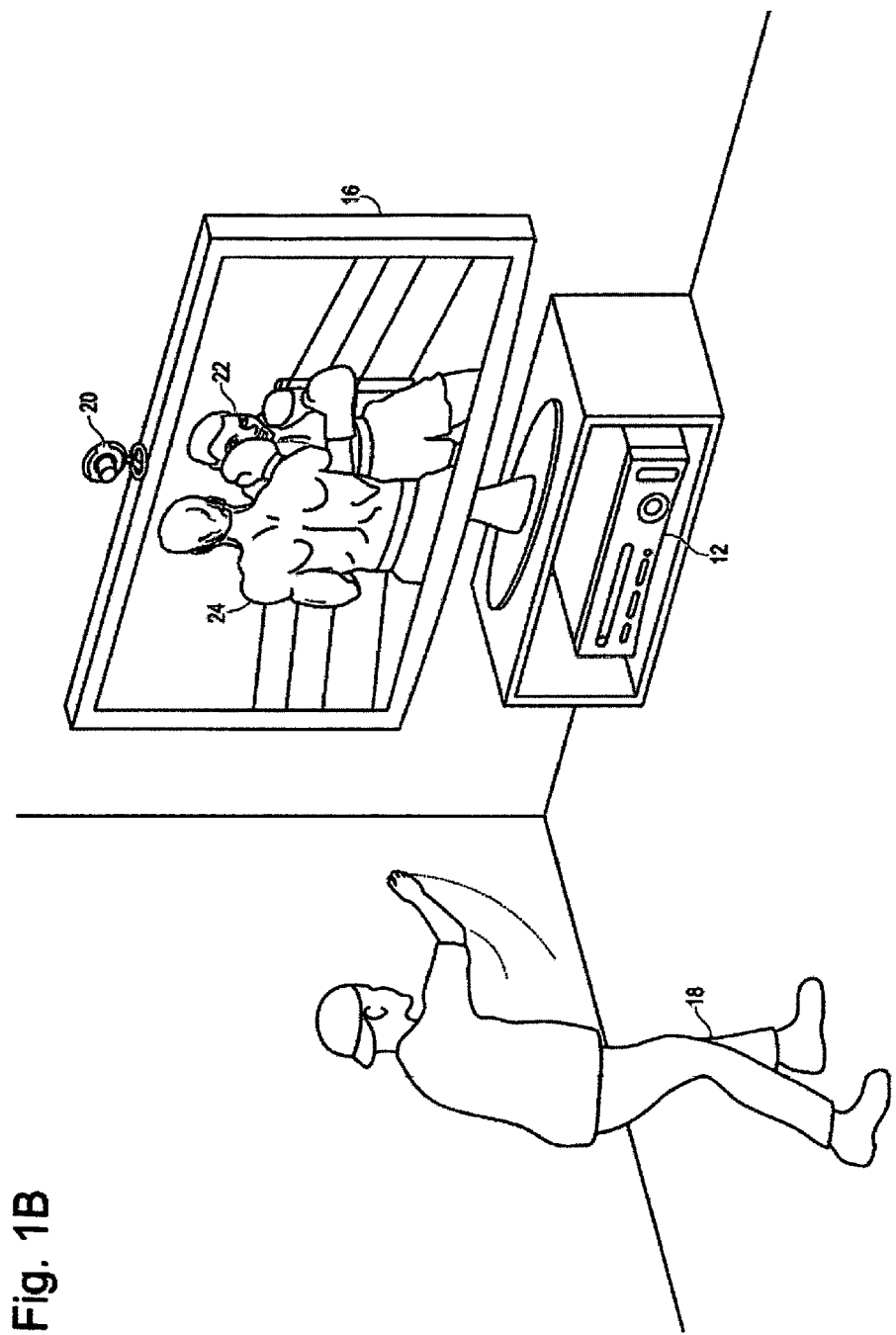

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, track a human target and/or adapt to aspects of the human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a detector that may be used to monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the position, movements and size of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object associated with them. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Each of these objects and any other object such as a bat, a glove, a microphone, a guitar, drums, one or more balls, a stand or the like that may be associated with a person may also be tracked and utilized and have a virtual screen associated with it.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
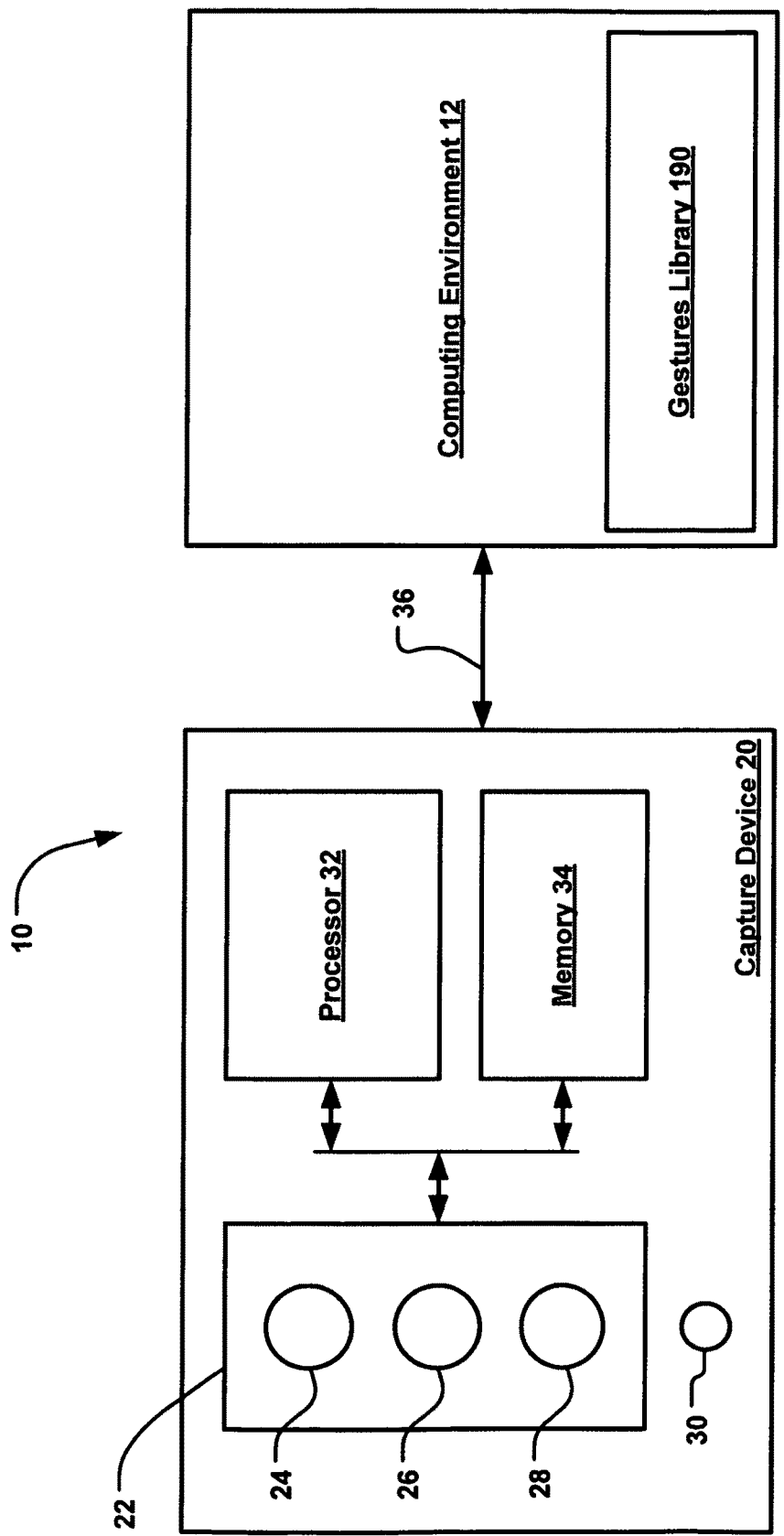
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 25. According to an example embodiment, the image camera component 25 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 25 may include an IR light component 26, a three-dimensional (3-D) camera 27, and an RGB camera 28 that may be used to capture the depth image of a scene. For example, in time-of-flight analysis, the IR light component 26 of the capture device 20 may emit an infrared light onto the scene and may then use sensors (not shown) to detect the backscattered light from the surface of one or more targets and objects in the scene using, for example, the 3-D camera 27 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 26. Upon striking the surface of one or more targets or objects in the scene, the pattern may become deformed in response. Such a deformation of the pattern may be captured by, for example, the 3-D camera 27 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 25. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, determine arm length or size by any means, including a skeletal tracking system or any other suitable instruction.

The capture device 20 may further include a memory component 34 that may store the instructions that may be executed by the processor 32, images or frames of images captured by the 3-D camera or RGB camera, player profiles or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 25 and the processor 32. According to another embodiment, the memory component 34 may be integrated into the processor 32 and/or the image capture component 25.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 27 and/or the RGB camera 28, and a skeletal model that may be generated by the capture device 20 to the computing environment 12 via the communication link 36. The computing environment 12 may then use the skeletal model, depth information, and captured images to, for example, create a virtual screen, adapt the user interface and control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 27, 28 and device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
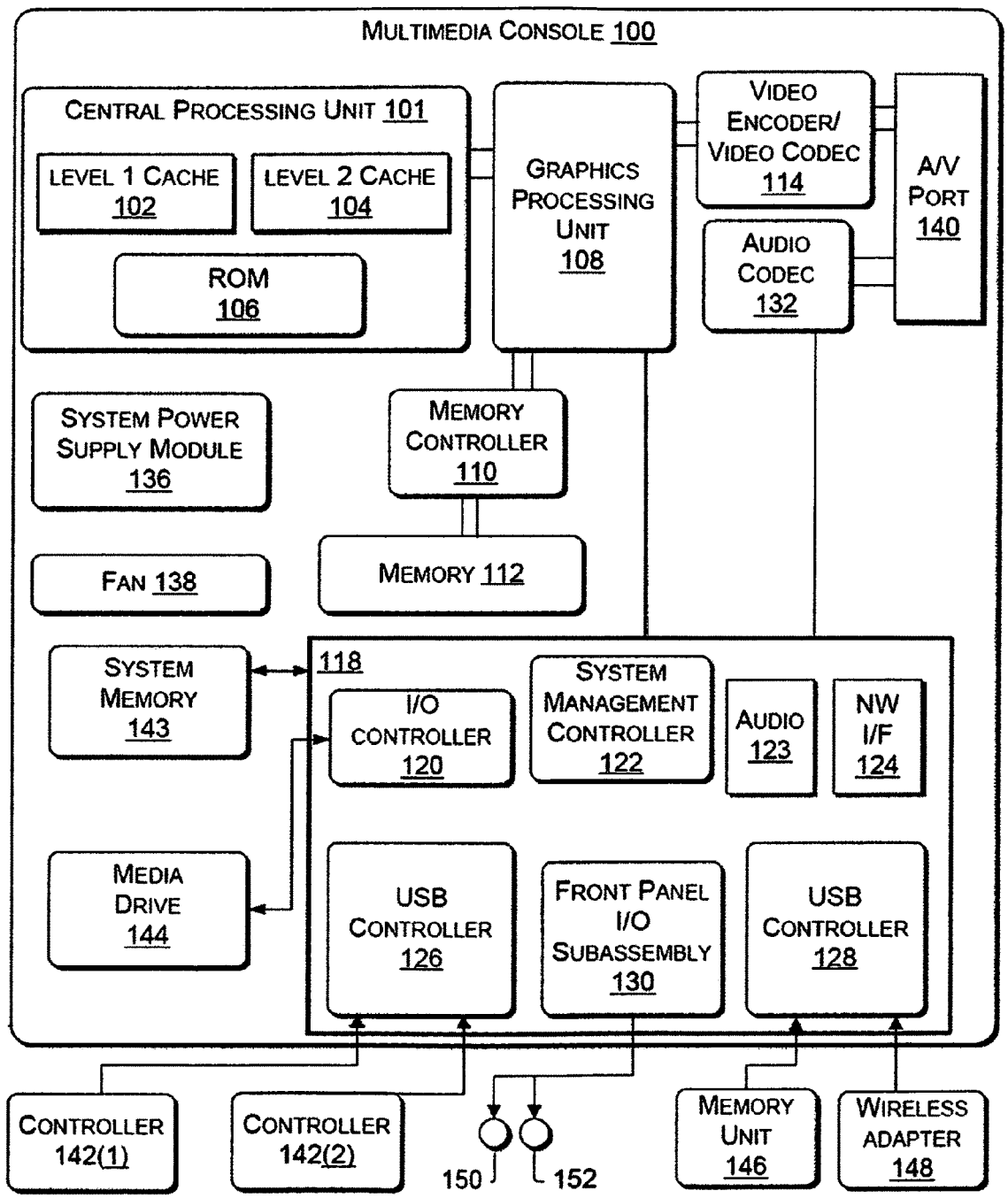
FIG. 3 illustrates an example embodiment of a computing environment that may be used to interpret one or more gestures in a target recognition, analysis, and tracking system.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

Figure 4:
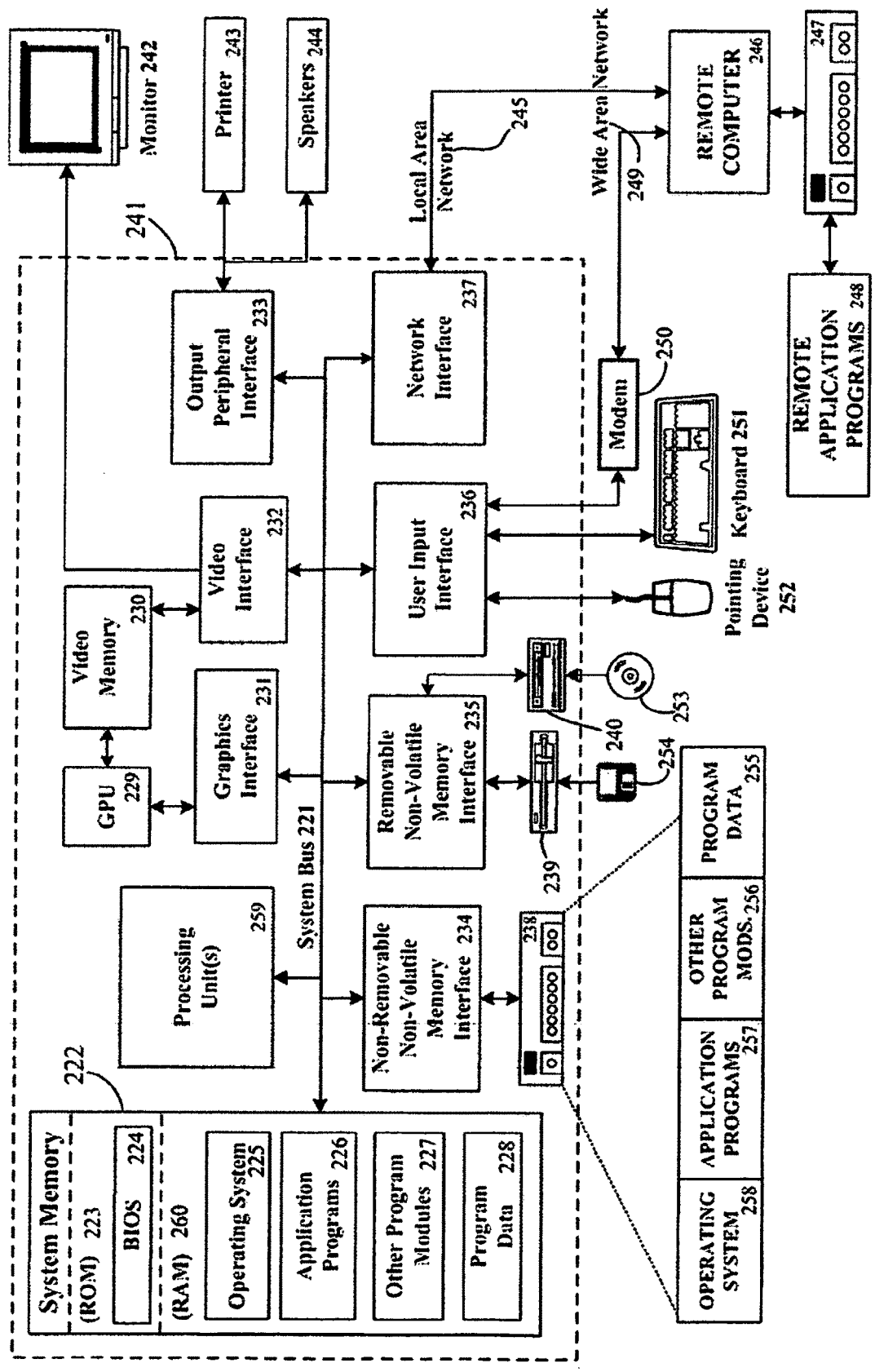
FIG. 4 illustrates another example embodiment of a computing environment that may be used to interpret one or more gestures in a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
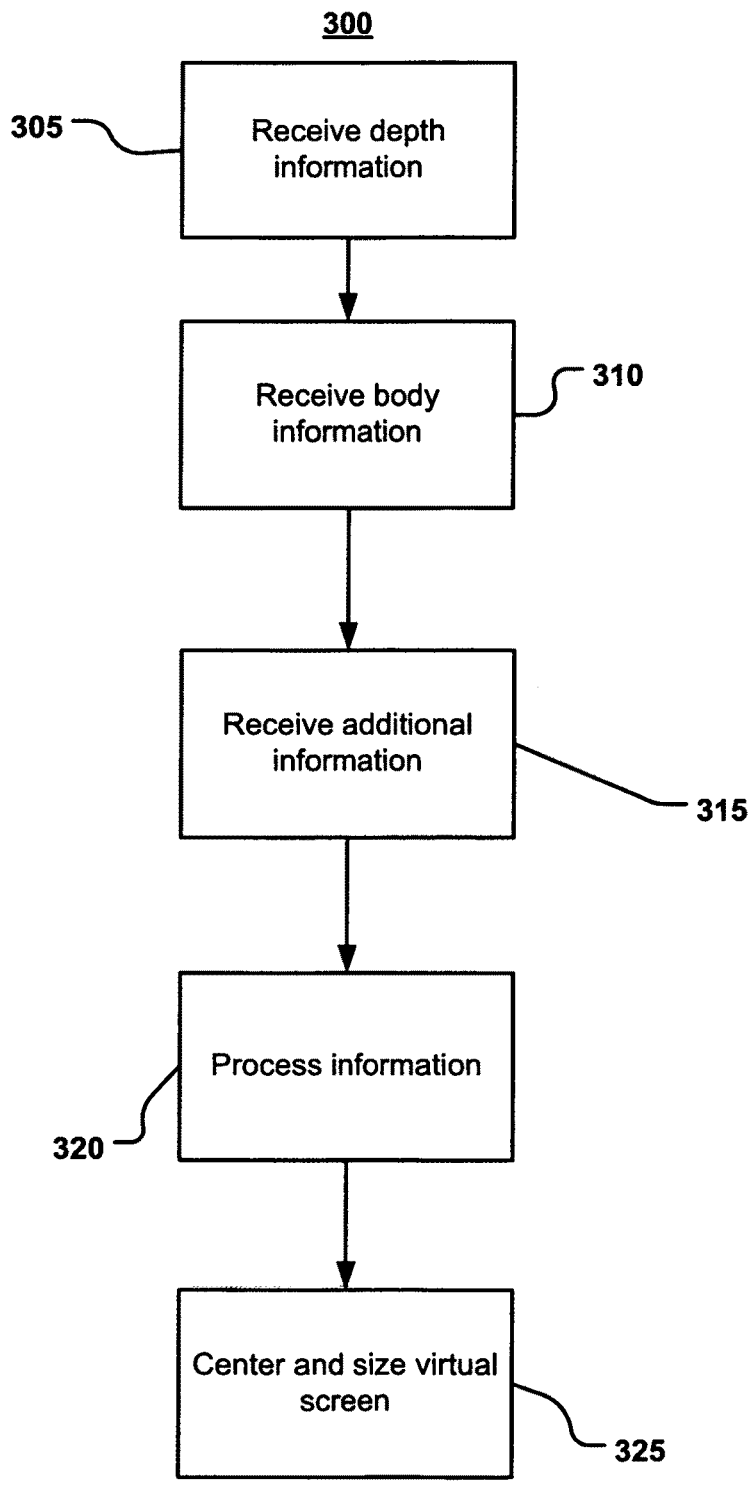
FIG. 5 depicts a flow diagram of an example method for sizing a virtual screen on a target.

FIG. 5 depicts a flow diagram of an example method 300 for centering a virtual screen on a target such as, for example user 18 and sizing and shaping the virtual screen according to the size of a user. The example method may also center a virtual screen on one or more appendages of user 18 and may size and shape the virtual screen according to the size, shape and depth of the appendages. The example method 300 may be implemented using, for example, the capture device 20 and/or the computing environment 12 of the target recognition, analysis, which may be contained in the target analysis, recognition and tracking system 10 described with respect to FIGS. 1A-4. In one embodiment, the virtual screen may be a projected representation of an audiovisual display such as, for example audiovisual display 16. In another embodiment, the virtual screen may be a projection onto a target of the extent of a range of motions available to an avatar in a computing environment such as computing environment 12.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store profile information about the target in a computing environment such as computing environment 12. The virtual screen may interact with an application that may be executed by the computing environment 12 described above with respect to FIGS. 1A-1B.

According to an example embodiment, a process may take place to determine if a target is a human when a target enters a capture device scene. If it is determined that a target is a human, depth information may be received at 305. For example, depth information may be received from capture device 20, which may contain any combination of one or more RGB cameras, one or more microphones, one or more IR cameras, or one or more depth cameras configured to obtain depth information associated with the one or more targets in the scene using any suitable technique such as time-of-flight analysis, structured light analysis, stereo vision analysis, or the like.

Depth information received at 305 may be used in combination with body information received at 310. Such body information may include, for example, height and/or arm length and may be obtained based on, for example, a body scan, a skeletal model, the extent of a user on a pixel area or any other suitable process or data. The depth information and body information may also be combined with additional information 315 including, for example, information that may be associated with a particular user such as a specific gesture, voice recognition information or the like. The additional information at 315 may also include, for example, information from one or more lookup tables to determine the size, wingspan and virtual screen of one or more targets such as, for example user 18.

In one embodiment, lookup tables may include tables containing information used to determine the size, wingspan and virtual screen of one or more targets such as, for example user 18.

In one embodiment, lookup tables information that may be used to determine the appropriate size and shape of a virtual screen around a user. For example, the lookup tables may include average human size profiles. In another example, the lookup tables may include tables of average shoulder width to wingspan ratios.

The obtained information is processed at 320. Information processing may include, for example, comparing information in one or more lookup tables to information received from the capture device. In one embodiment, the lookup tables may compare average human size profiles to the size of the target received from the capture device 20. The lookup tables may also include ratios of shoulder width to wingspan, which may be compared with information from the capture device 20. Any processed information is then used to center and size a virtual screen at 325.

According to example embodiments, the lookup tables may also include user specific profile information. In one embodiment, the computing environment such as computing environment 12 may include stored profile data about one or more users in lookup tables. The stored profile data may include, among other things the targets scanned or estimated body size, skeletal models, body models, voice samples or passwords, the targets age, previous gestures, target limitations and standard usage by the target of the system, such as, for example a tendency to sit, left or right handedness, or a tendency to stand very near the capture device. This information may be used at information processing 320 to determine if there is a match between a target in a capture scene and one or more user profiles, that, in one embodiment, may allow the system to adapt the virtual screen to the user at 325, or to adapt other elements of the computing or gaming experience according to the profile.

User specific information may also include tendencies in modes of play by one or more users. For example, if a user tends to use broad or sweeping gestures in to control a computing environment, elements of the computing or gaming experience may adapt to ignore fine or precise gestures by the user. As another example, if a user tends to use fine or precise motions only, the computing or gaming system may adapt to recognize such gestures utilize more fine or precise gestures in control of the computing environment. As a further example, if, in one handed applications, a user tends to favor one hand over the other, the gaming system may adapt to recognize gestures from one hand and ignore gestures from the other.

One or more personal profiles may be stored in computer environment 12 and used in a number of user sessions, or one or more personal profiles may be created for a single session only. Users may have the option of establishing a profile where they may provide information to the system such as a voice or body scan, age, personal preferences, right or left handedness, an avatar, a name or the like. Personal profiles may also be provided for "guests" who do not provide any information to the system beyond stepping into the capture space. A temporary personal profile may be established for one or more guests. At the end of a guest session, the guest personal profile may be stored or deleted.

Centering, shaping and sizing a virtual screen on a target may be provided to one or more targets simultaneously. Centering, shaping and sizing of a virtual screen on each target may be running continuously throughout a session, and thus may continually update the shape and size of the virtual screen based on information received about the target from a source such as, for example capture device 20. Accordingly, if a target is moving in a capture scene, the virtual screen may continually center on them and adapt to movements that they may make. Some of the information from each target session may be stored in a user profile that may be used in later target sessions.

According to one embodiment, the target may also be scanned periodically during a session. This scan may be used to generate a model of a target, where the model may be a skeletal model, a mesh human model or any other suitable representation thereof. This model may include specific data about the size and wingspan of a user and may be provided to a personal profile of a target, and it may also be used to update the shape and size of a virtual screen around the target. The scan may be a more accurate representation of a target than may be provided by a lookup table, and thus may provide a closer match to the wingspan of a target and the size of the virtual screen. According to on embodiment, a target may be scanned upon entry as well as periodically throughout a session to generate a model. These scans may also be provided to the personal profile.

In an example embodiment, as described above, the target may include the user 18 described above with respect to FIGS. 1A-1B. The virtual screen may track a user 18, or one of his appendages and receive gestures from user 18 as he moves in the virtual screen. The gestures in the virtual screen may act as a real-time user interface that adjusts to aspects of the user 18 such as the distance from the capture device, his orientation in the capture scene and movements that he makes, such as, for example, standing up or sitting down. The gestures in the virtual screen may act as controls parameters of an application such as an electronic game. For example, the tracked motions of a user may be used to move an on-screen character or avatar in an electronic role-playing game; to control an on-screen vehicle in an electronic racing game; to control the building or organization of objects in a virtual environment; or to perform any other suitable controls of an application.

According to an example embodiment, the depth information received at 305 may include a depth image. The depth image may be a plurality of observed pixels where each observed pixel has an observed depth value. For example, the depth image may include a two-dimensional (2-D) pixel area of the captured scene where each pixel in the 2-D pixel area may represent a depth value such as a length or distance in, for example, centimeters, millimeters, or the like of an object in the captured scene from the capture device. The plurality of observed depth pixels where each observed pixel has an observed value may be used to determine the size of the object by, for example, counting the number of pixels that the object fills, determining the depth and calculating the height or width, which may be a user such as user 18.

Figure 6:
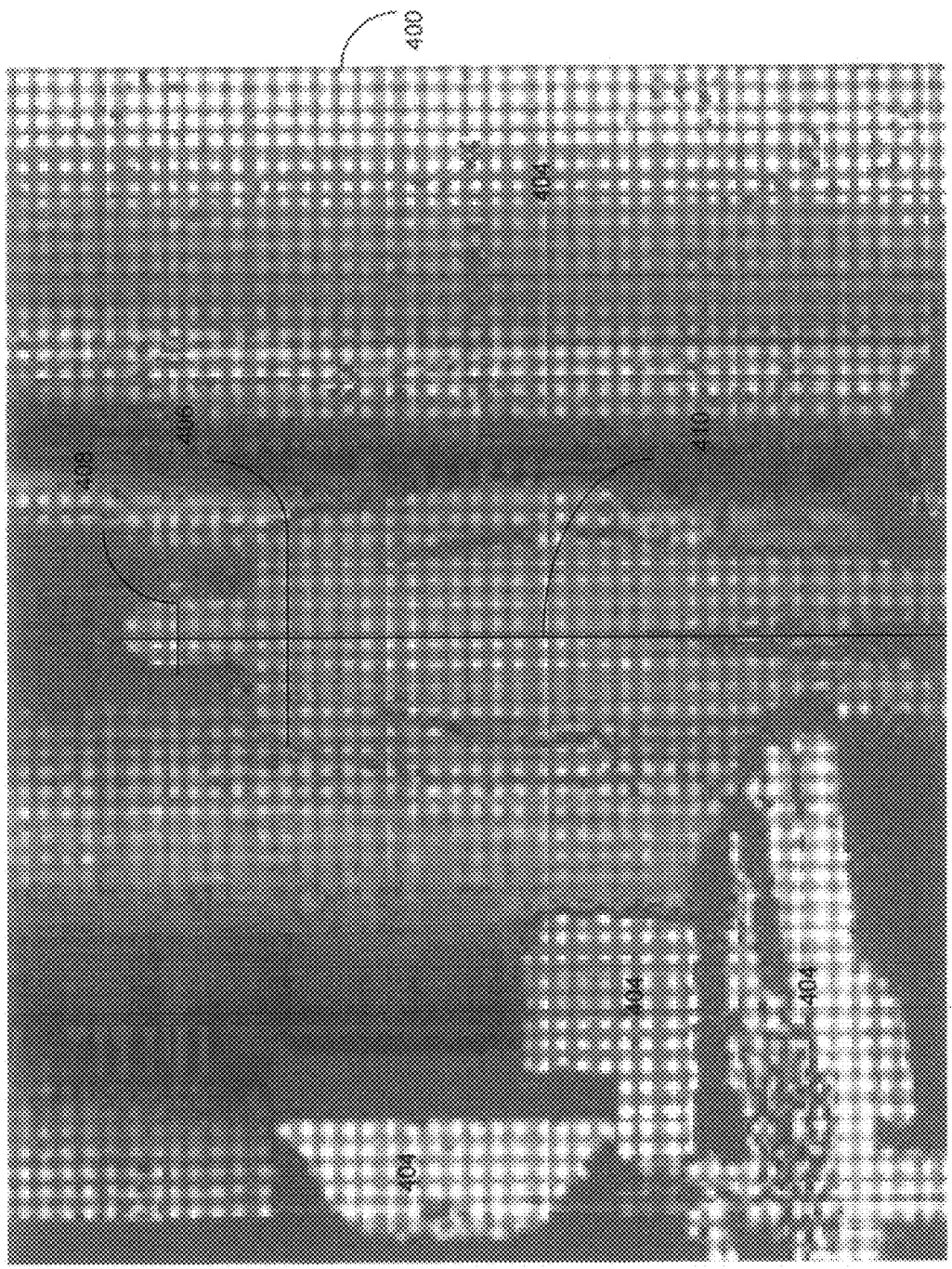
FIG. 6 illustrates an example embodiment of a depth image.

FIG. 6 illustrates an example embodiment of a depth image 400 that may be received at 305. According to an example embodiment, the depth image 400 may be an image or frame of a scene captured by, for example, the 3-D camera 27 and/or the RGB camera 28 of the capture device 20 described above with respect to FIG. 2. As shown in FIG. 6, the depth image 400 may include a human target 402 and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may represent a depth value such as a length or distance in, for example, centimeters, millimeters, or the like of a target or object in the captured scene from the capture device.

According to one embodiment, a depth image such as depth image 400 or an image on an RGB camera such as camera 28, or an image on any other detector may be processed and used to determine the shape and size of a target. Using for example, the depth values in the plurality of observed pixels that are associated with a human target 402 and the extent of one or more aspects of the human target such as the height 410, the width of the head 408 or the width of the shoulders 406 or the like, the size of the human target may be determined. This size may be used to create a virtual screen as described below around the target. The size may also be used to find the center point of a virtual screen and in the creation of a model of the user.

Referring back to FIG. 3, in one embodiment, upon receiving the depth image with, for example, the depth information at 305, the depth image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to size a virtual screen on a user as described above.

FIG. 7 illustrates one or more users at two different distances from a capture device, and the virtual screen adapting itself according to the size of the user and the distance to the user. According to one embodiment, only the virtual screen will adapt, and the scene depicted on audiovisual device 16 will remain the same and target recognition, analysis and tracking system 10 will not alter its response to movements of a skeletal model in the virtual screen.

In an example embodiment, a target such as user 18 may be in a capture scene at a distance 504 from a capture device such as capture device 20. Based on the distance to the user along with other measurements based on aspects of the user and/or stored information or profiles, virtual screen 502 may be centered on user 18. The virtual screen 502 may be a representation of, for example the range of motion that boxer 24 on screen 14 has available to it. As user 18 moves to a second distance 508 from the capture device 20, the virtual screen may remain centered and resize to size 506, and be an equivalent representation of the range of motion that boxer 24 on screen 14 has available to it.

In another embodiment, FIG. 7 has two targets in the same capture scene, each of which has a virtual screen centered on them, and each sized based on aspects of the user and/or stored information.

According to a second embodiment the target recognition, analysis and tracking system 10 and/or the audiovisual device 16 may adapt based on target information such as their typical modes of play. According to one embodiment, the distance of the user from a capture device such as capture device 20 may cause one or more aspects of the target recognition, analysis and tracking system 10 to adapt. According to other embodiments, profile information, such as limited abilities that a particular user may have, their tendency to be smooth, erratic, gross or minor in their motions, or the age of the user may cause the target recognition, analysis and tracking system 10 to adapt. Other embodiments may cause the computing environment 12 to adapt the user experience because of the mode that the device is in, such as, for example a menu mode or a pause mode. In another embodiment, if a user is sitting as opposed to standing, the response of the target recognition, analysis and tracking system 10 and the output to the audiovisual device 16 may adapt.

The adaptations that the target recognition, analysis and tracking system 10 may make with respect to audiovisual device 16 may include making text, menus, icons, characters or any other representations on the audiovisual device 16 larger or smaller. Icons, characters, graphical elements, data and information on the screen may also be moved on the visual display. Adaptations in color and/or brightness of objects may also be based on target information received from capture device 20. The number of menus, icons, characters, graphical elements data and information may also change. For example, moving a user to a far distance may cause an increase in size of icons, shifting important icons to the corners of the display, and decreasing the overall number of icons. As another example, the location number and size of icons may change based on a person's age. If a person is very young or very old, the number of icons may decrease, the size of the text or icons may increase and the icons may be placed in easier to reach locations.

In one embodiment, a cursor may also be provided on the screen, where the cursor tracks the motion of an appendage of a user. For example, a virtual screen may be sized and shaped around the dominant arm of a user, the dominant arm being determined by input into a user profile or by a typical mode of use. The virtual screen around the arm may center on the of the arm and track an onscreen cursor to motion of the arm. Aspects of the user, such as his distance to the screen, age, and ability may cause the cursor to adapt in one or more ways. In one embodiment, the cursor may increase or decrease in size. In another embodiment, the cursor may move more slowly or smoothly than the gestures of the individual. In a third embodiment, the cursor may move more rapidly than the gesture of the user. In another embodiment, the cursor may snap to objects that may be selected by the user. In another embodiment, the cursor may create a time gap between the motion of the user and motion of the cursor on the screen.

Adaptations with respect to target recognition, analysis and tracking system may also be made by the computing environment 12. For example, virtual representations of icons or other important areas may become "magnetic". As used herein, magnetic means that, for example, a pointer on an audiovisual display such as audiovisual display 16 may snap to important icons, or may have a greater tendency to move towards important screen locations based on user gestures. In an example embodiment, if, for example, a users profile indicates that they typically operate with large gestures only, the target recognition, analysis and tracking system may adapt with expectations that fine or precise gestures may be ignored. According to another embodiment, if a user profile or size indicates that a user is very young, and thus more likely to move in an erratic fashion, the target recognition, analysis and tracking system may adapt its response to movements to smooth or aid the motions of the user. Any other suitable adaptation based on distance or user profiles may also be included in computing environment 12 and/or target recognition, analysis and tracking system 10.

What is claimed:

1. A method comprising:
analyzing a depth data to locate a person in the depth data;
determining a distance of the person from a capture device used to generate the depth data or a display device communicatively coupled to the capture device, and a size of the person within the depth data;
determining, based on the distance and the size of the person, at least one of a size, shape or location of a physical area in which the person's movements are evaluated;
determining motions of the person within the determined physical area in which the person's movements are evaluated;
analyzing a second depth data to locate the person in the second depth data;
determining a second distance of the person from the capture device used to generate the depth data or the display device communicatively coupled to the capture device, and a second size of the person within the depth data, the person having changed physical locations between the second depth data and the depth data;
determining, based on the second distance and the second size of the person, at least one of a size, shape or location of a second physical area in which the person's movements are evaluated, the second physical area differing from the first physical area; and
determining second motions of the person within the second physical area in which the person's movements are evaluated.

2. The method of claim 1, further comprising adjusting an audiovisual display based on at least one of the distance or the size of the person.

3. The method of claim 2, wherein a cursor on the audiovisual display tracks the person's motions, and wherein the tracking by the cursor is adjusted according to at least one of the person's playing history, typical mode of play, or profile information.

4. The method of claim 1, wherein the distance is measured using a depth camera.

5. The method of claim 1, wherein the size and shape of the physical area in which the person's movements are evaluated is determined based on additional information obtained from a lookup table.

6. The method of claim 1, wherein determining the at least one of size, shape, or location of the physical area in which the person's movements are evaluated further comprises:
identifying a profile associated with the person, the profile comprising stored information about the person including size or facial recognition or voice recognition, or any combination thereof.

7. The method of claim 6, wherein information stored in the profile further comprises at least one of one or more aspects of the person's playing history, age, or the person's typical mode of play.

8. The method of claim 6, wherein an audiovisual display is adjusted according to stored profile information of the person.

9. The method of claim 1, wherein the physical area in which the person's movements are evaluated is centered on, and has dimensions corresponding to at least one of the person, an appendage of the person, or an object associated with the person.

10. The method of claim 1, wherein determining motions by the person is performed based on a precision of the person's motions.

11. A computer readable storage device having stored thereon computer executable instructions that, when executed on a computer, cause the computer to perform operations comprising:
analyzing a depth data to locate a person in the depth data;
determining a distance and a size of the person;
determining, based on the distance and the size of the person, at least one of a size, shape or location of a physical area in which the person's movements are evaluated;
determining motions of the person within the determined physical area in which the person's movements are evaluated;
analyzing a second depth data to locate the person in the second depth data;
determining a second distance of the person from the capture device used to generate the depth data or the display device communicatively coupled to the capture device, and a second size of the person within the depth data, the person having changed physical locations between the second depth data and the depth data;
determining, based on the second distance and the second size of the person, at least one of a size, shape or location of a second physical area in which the person's movements are evaluated, the second physical area differing from the first physical area; and
determining second motions of the person within the second physical area in which the person's movements are evaluated.

12. The computer readable storage device of claim 11, further having stored thereon computer executable instructions that, when executed on the computer, cause the computer to perform operations comprising:
adjusting an audiovisual display or a cursor or both based on at least one of the distance or the size of the person.

13. The computer readable storage device of claim 11, wherein the size of the person comprises at least one of height, or arm length.

14. The computer readable storage device of claim 11, wherein determining the at least one of size, shape or location of the physical area in which the person's movements are evaluated comprises determining a portion of the person to center the screen on, and identifying a profile associated with the person, wherein the profile comprises stored information about the person including size or facial recognition or voice recognition, or any combination thereof, wherein the physical area in which the person's movements are evaluated is centered on and has dimensions corresponding to at least one of the person, an appendage of the person or an object associated with the person.

15. The computer readable storage device of claim 14, further having stored thereon computer executable instructions that, when executed on the computer, cause the computer to perform operations comprising:
adjusting an audiovisual display according to stored profile information of the person.

16. A system, comprising:
a processor; and
a memory communicatively coupled to the processor when the system is operational, the memory bearing processor-executable instructions that, when executed upon the processor, cause the system to at least:
analyze an image captured with a detector to locate a person in the image;
determine a distance and a size of the person within the image;

determine, based on the distance and the size of the person, at least one of a size, shape or location of a physical area in which the person's movements are evaluated;

determine motions of the person within the determined physical area in which the person's movements are evaluated;

analyzing a second depth data to locate the person in the second depth data;

determining a second distance of the person from the capture device used to generate the depth data or the display device communicatively coupled to the capture device, and a second size of the person within the depth data, the person having changed physical locations between the second depth data and the depth data;

determining, based on the second distance and the second size of the person, at least one of a size, shape or location of a second physical area in which the person's movements are evaluated, the second physical area differing from the first physical area; and determining second motions of the person within the second physical area in which the person's movements are evaluated.

17. The system of claim 16, wherein the detector comprises a depth camera.

18. The system of claim 16, wherein the instructions that, when executed on the processor, cause the system to at least determine the at least one of size, shape or location of the physical area in which the person's movements are evaluated further cause the system to at least:

determine the at least one of size, shape or location of the physical area in which the person's movements are evaluated by identifying a profile associated with the person, the profile comprising stored information about the person including size or age, or facial recognition or voice recognition, or any combination thereof.

19. The system of claim 16, wherein the physical area in which the person's movements are evaluated has dimensions corresponding to at least one of the person, an appendage of the person or an object associated with the person.

* * * * *